United States Patent [19]

Küchenthal et al.

[11] Patent Number: 4,483,698
[45] Date of Patent: Nov. 20, 1984

[54] APPARATUS FOR PAINT MIST REMOVAL

[75] Inventors: Gunther Küchenthal, Ludwigsburg; Joachim Klingner, Gerlingen, both of Fed. Rep. of Germany

[73] Assignee: Werner & Pfleiderer, Stuttgart, Fed. Rep. of Germany

[21] Appl. No.: 386,363

[22] Filed: Jun. 8, 1982

[51] Int. Cl.³ ............................................. B01D 47/10
[52] U.S. Cl. .................................... 55/238; 55/399; 55/413; 55/459 D; 55/460; 55/DIG. 46; 98/115 SB; 261/79 A; 261/DIG. 54; 118/DIG. 7; 366/165; 366/337
[58] Field of Search .................................. 55/235–238, 55/399, 413, 454, 457, 459 R, 459 D, 460, DIG. 46; 98/115 SB; 118/DIG. 7; 366/165, 337; 261/79 A, DIG. 54

[56] References Cited

U.S. PATENT DOCUMENTS

| 467,264 | 1/1892 | Raymond | 261/79 A |
|---|---|---|---|
| 3,304,695 | 2/1967 | Krochta | 55/238 |
| 3,577,711 | 5/1971 | Bernardo | 55/459 D |
| 3,729,898 | 5/1973 | Richardson | 55/238 |
| 4,019,883 | 4/1977 | Klomp | 55/460 |
| 4,061,479 | 12/1977 | Hölter et al. | 55/238 |
| 4,215,081 | 7/1980 | Brooks | 366/165 |

FOREIGN PATENT DOCUMENTS 2800668 12/1979 Fed. Rep. of Germany .... 55/DIG. 46

Primary Examiner—David L. Lacey
Attorney, Agent, or Firm—Felfe & Lynch

[57] ABSTRACT

Apparatus for washing paint mist from exhaust air from a spray-painting operation draws the exhaust air, paint mist, and a washing liquid down a funnel inlet into an open ended cylindrical mixing chamber. In the mixing chamber, they turbulently spiral outwardly to exit said chamber through the open ends thereof. An elongated blocking structure is centrally disposed in said mixing chamber to block access of exhaust air to the central portion of the mixing chamber which has low spiral turbulence and thus low mixing efficiency. The inlet to the mixing chamber and the open end outlets therefrom preferably form venturies to further increase the mixing efficiency.

11 Claims, 15 Drawing Figures

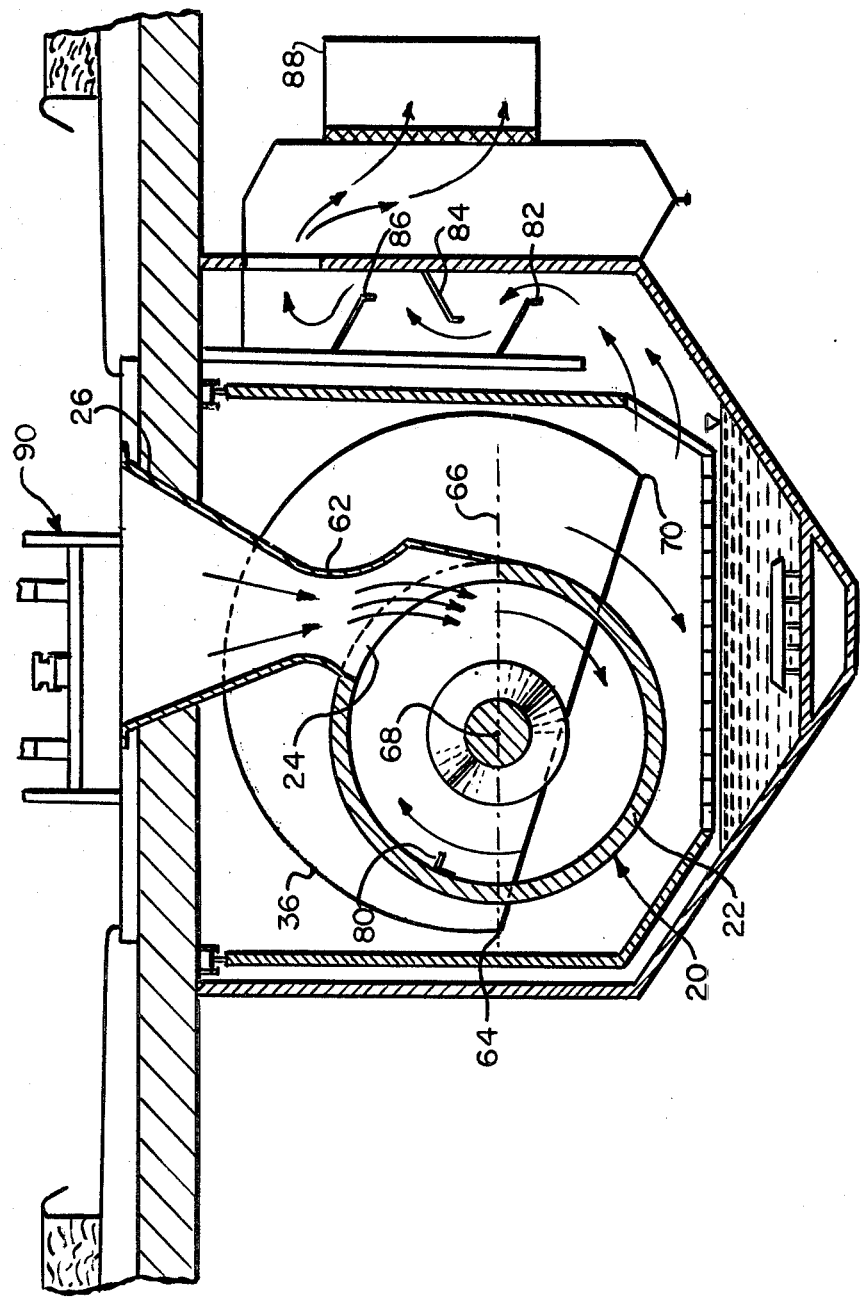

APPARATUS FOR PAINT MIST REMOVAL

BACKGROUND OF THE INVENTION

The invention relates to an apparatus for removal of paint mist from exhaust air in an exhaust system of a spray-painting operation. More particularly, the invention relates to an improved method for washing paint mist from the exhaust air by turbulent mixing with water.

The present invention is an improvement over the type of device disclosed in West German O.S. No. 2,800,668. Generally, this known exhaust system draws exhaust air, by means of reduced pressure, into a mixing chamber, over and/or through a washing liquid, and through a stabilizing chamber whereby paint mist is removed from the exhaust air.

The important features of a paint washing device of the type over which the present invention is an improvement include vigorous turbulent mixing of the exhaust air with the washing liquid whereby the paint is absorbed onto washing liquid droplets and precipitated into a sump of the apparatus to coagulate and form a sludge. The sludge can be removed as required.

The washing liquid used is primarily water. Commercially available chemicals and anti-foamer are normally added to the water to coagulate the paint and cause it to sink for removal from the exhaust system sump.

The mixing chamber is constructed as an open-ended cylinder, usually with a generally circular cross-section. The open ends serve as exhaust outlets from the chamber. The inlet is an exhaust air feed funnel the smaller opening of which terminates approximately tangentially to the wall of the cylinder at a mid-portion of the cylinder.

The exhaust air and the washing liquid entering the cylindrical mixing chamber at the mid-portion thereof flow in a spiral path outwardly toward the open ends of the mixing chamber. To insure better mixing, it is usual to include an elongated flange extending radially inwardly from the inner wall to break up the flow of water and provide turbulent mixing with the exhaust air as they spiral toward the open ends of the chamber. This flange structure normally extends along the full length of the inner wall of the chamber.

It is also known from O.S. No. 2,800,668, to block the inlet of the mixing chamber partially to provide turbulent flow mixing of liquid and exhaust gas as they flow into the mixing chamber.

The present invention is based on the realization that the greater and more vigorous the period of turbulent flow or mixing of liquid and exhaust air, the better will be the washing ability of the device.

One can obtain greater and more vigorous turbulent flow by increasing the speed at which air moves through the mixing chamber. For practical situations, there are certain design characteristics which limit the volume of air flowing through a washing device for a paint mist exhaust system; these include the size of the spray booth to be ventilated. Thus, increasing the flow rate through the exhaust system requires adjusting the size of the washing chamber and, concurrently, adjusting exhaust fans which generate the pressure differential required to increase the velocity of air there through as required. However, the energy consumption of usual exhaust fan systems is exponentially proportional to the differential pressure change (depending on conditions to be maintained). As can readily be understood, more than a moderate increase in differential pressure to be maintained across the system can result in an unacceptably great increase in the use of energy for the system. Thus, a substantial increase in the efficiency of known systems e.g. that shown in German O.S. No. 2,800,668, if it can be accomplished at all, would be expected to require unacceptably high increases in energy use.

It is further noted that presently available systems can barely maintain a cleaning capacity of about 3 mg. paint particles per cubic meter of air leaving the washing system for a normal spray-painting operation. As usual exhaust air volumes of a spray booth system can reach up to 600,000 cubic meters per hour or more, there can be several gallons of paint per hour passing through the duct work and fans of a typical exhaust system. As is readily realized, this can cause quite a mess, as well as the clogging of various portions of the system, including the exhaust fans, thus necessitating closing down the system for clean up, usually bimonthly.

In addition, the exhaust air leaving most washing systems still contains such a high paint particle content that the exhaust air is normally vented into the atmosphere, thus carrying away the still-contained paint and any solvents used in the spray operation. Although the exhaust air can be filtered with dry filters (which remove the paint but not the solvents) and recycled into unmanned zones—or the solvents also can be reclaimed in a condensation (distillation) type recovery unit and the exhaust air then fed back into manned zones—such cleaning operations are impractical because of the rapid clogging of the systems with the paint. As about 50% of the energy consumption in a spray shop is in preparing the air for the spray booths—to heat and condition the air including removal of dust etc.—the ability to recycle such air would produce tremendous energy and cost savings.

Therefore, a washing system which could reduce the amount of paint left in the exhaust air well below the presently considered "good" 3 mg. per cubic meter, would result in considerable energy saving as well as a cleaner operation.

SUMMARY OF THE INVENTION

It is therefore a primary object of the present invention to provide a washing device for a paint mist exhaust system which is capable of reducing the paint particle contamination left in the exhaust air after passing through the system to a small fraction of the present "good" standard of 3 mg. per cubic meter. It is a further primary object of the invention to accomplish such increase in washing efficiency with only a relatively moderate increase in energy consumption in the operation of the exhaust system. However, because the cleaner exhaust can be more easily recycled, and solvents reclaimed therefrom, the cost of operating the inventive system is expected to be no more than, and probably considerably less than that of conventional systems.

These objects are accomplished by an improved washing apparatus which provides greater mixing of exhaust air and washing liquid with relatively small increases in energy use.

An important feature of the apparatus is a blocking structure disposed generally along the central axis of a mixing chamber. A spiralling exhaust air path is provided through the mixing chamber, and it is readily understood that the central portion of the mixing chamber therefore has the slowest angular speed of air flow therefore. Little or no turbulent flow occurs in this portion of the chamber, and exhaust air flowing through the central portion of the chamber is washed little, if at all. The prior art elongated flange or the like reduced this central non-washing to some extent but does not appear to have eliminated the problem. Blocking the center with a structure prevents exhaust air from residing in the central "dead spot" in the air flow, however, thereby insuring that all of the air flowing through the chamber is forced into contact with the washing liquid. This blocking structure alone has been found to greatly improve the washing efficiency of the system.

Enlarging the end portions of the blocking structure causes a so-called Venturi effect to occur near the ends of the mixing chamber, thereby preferably increasing turbulent flow at that point without greatly increasing the pressure or the energy requirements of the system. Furthermore, the exhaust air feed funnel can also be formed with a reduced or necked central portion to take advantage of the Venturi effect at the inlet, thereby still more preferably increasing turbulent flow at that point similarly. By operating the mixing chamber, inlet venturi and outlet venturi all at less-than-maximum flow rates, a preferred cumulative efficiency much greater than could be predicted from the prior systems is accomplished with little increase in energy consumption.

BRIEF DESCRIPTION OF THE DRAWINGS

In the drawings:

FIG. 14 is a sectional view of an exhaust system with the inventive washing device.

DESCRIPTION OF THE PREFERRED EMBODIMENTS

Figure 1:
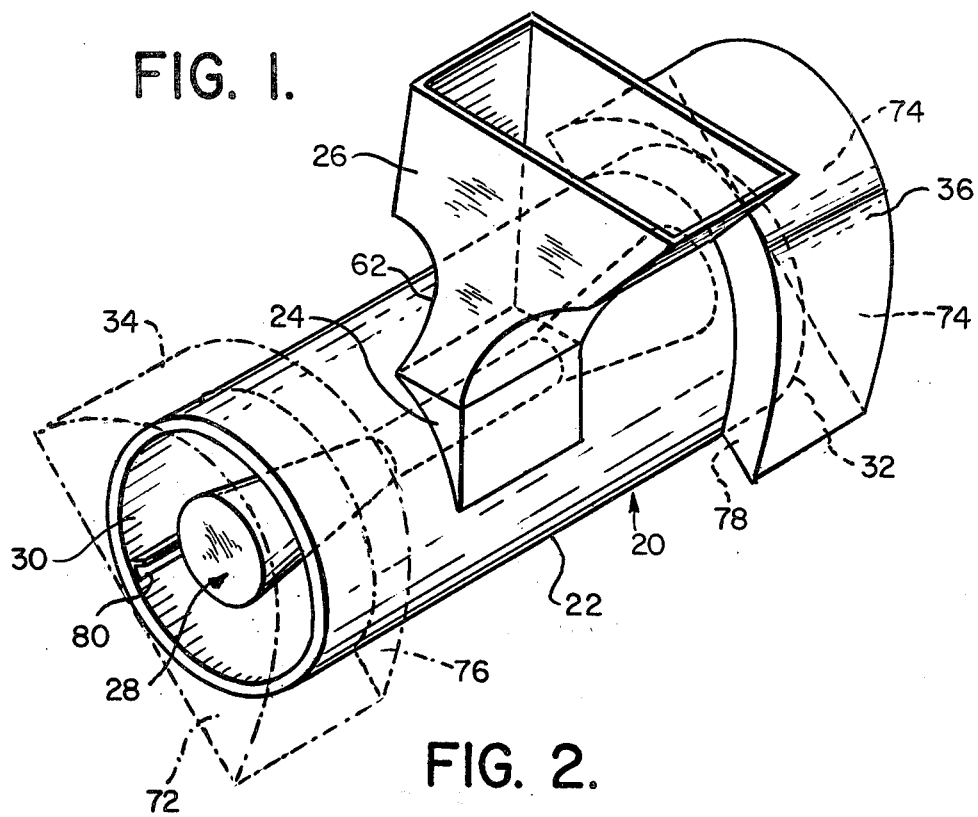
FIG. 1 is a perspective view of the washing device according to the present invention.

FIG. 1 shows a washing device 20 for a paint mist exhaust system according to the present invention. The washing device 20 includes washing or mixing chamber 22 in the form of an open ended cylindrical structure with a side wall inlet 24 through which exhaust air passes from the spray booth (not shown), via a funnel inlet 26, into mixing chamber 22.

Centrally disposed along the central axis of the mixing chamber 22 is an elongated blocking structure 28 which acts to block access of exhaust air passing through the mixing chamber 22 to the central portion of the mixing chamber 22. The ends of mixing chamber 22 form outlets 30, 32 through which the exhaust air exits the mixing chamber 22. Disposed around each outlet 30, 32 is an air deflector 34, 36 which reduces turbulent flow of the exhaust air as it passes out of the mixing chamber 22 to facilitate separation of air and liquid after washing.

Figure 2:
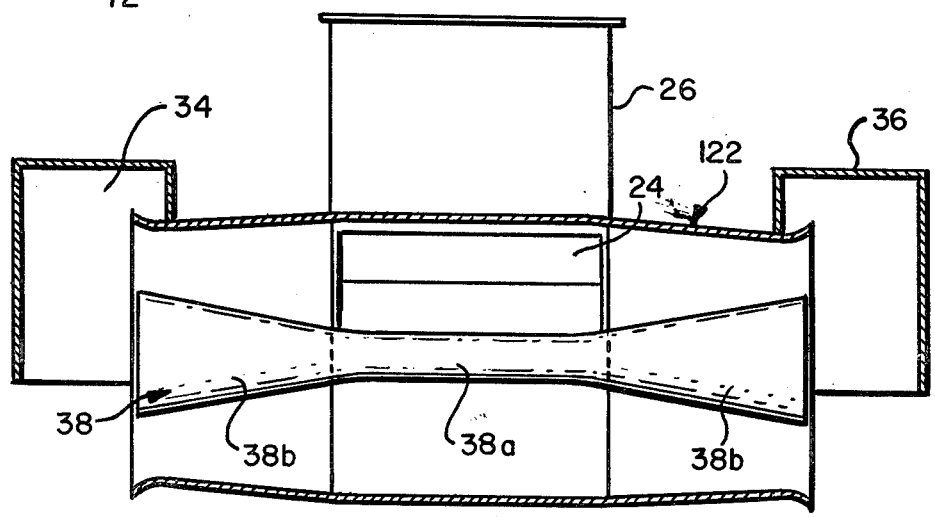
FIG. 2 is a sectional view of an embodiment similar to FIG. 1, showing the air deflector in place.

FIG. 2 is a sectional view of an embodiment similar to FIG. 1, but with a flare ended chamber 122 and both the air deflectors 34, 36 in place. FIGS. 3 through 13 are views similar to FIG. 2 but showing other embodiments of the invention with respect to various elongated blocking structures 28 and various mixing chamber 22 configurations. The air deflectors 34, 36 have been left off FIGS. 3 through 13 although, in the most preferred embodiments, these are included. Because they act to reduce the turbulent flow of the exhaust air exiting the mixing chamber 22, they facilitate separation of exhaust air and liquid thereby reducing the number of air/liquid separation baffles required for subsequent downstream portions of the paint mist exhaust system of the type in which the present invention is intended to operate—as will be described in greater detail with respect to FIG. 14. Because the exhaust air is less restricted by the use of fewer air/liquid separation baffles 82,84,86 (FIG. 14) the energy requirement with respect to this part of system is reduced.

Figure 3:
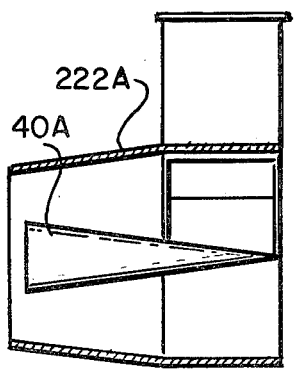
FIG. 3 is a view similar to FIG. 2, showing a half-tube system with different blocking tube and mixing tube embodiments, and with the air deflectors removed.

FIG. 3 is a half tube 222A structure which can be used where lower volumes of exhaust air are to be washed. Such a structure is expected to be equivalent to, and to have substantially the same washing efficiency as the corresponding "whole" tube structure.

As can be seen from FIGS. 1-13, the elongated blocking structure 28 can take any one of a large number of generally cylindrical forms. In fact, any elongated structure blocking the central portion of the mixing chamber 22 is expected to give an improvement in washing efficiency because of its blocking effect. Generally circular cross sectioned forms are preferred because they are less likely to clog or otherwise hold up paint.

The elongated blocking structure 38 of FIG. 2 has a generally smaller diametered central portion 38a and outer portions 38b which progress to increasingly larger sizes from the central portion 38a outwardly.

Figure 4:
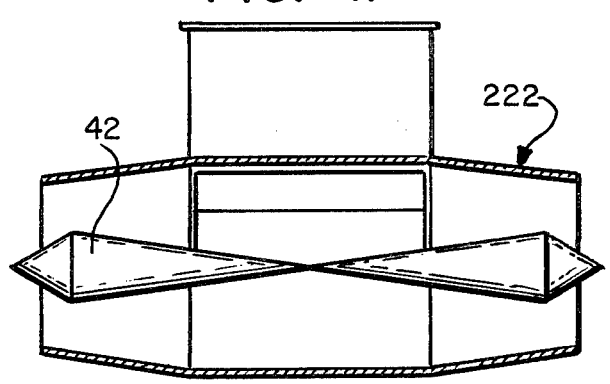
FIGS. 4 to 13 are views similar to FIG. 2 but with various other blocking structure forms and shapes and various mixing chamber forms and shapes; and with the air deflectors removed.

The elongated blocking structure 40A of FIG. 3 is similar to that of FIG. 2 except that only one side is required. The elongated blocking structure 42 of FIG. 4 is similar in design to that of FIG. 3 except that the extreme ends taper downwardly from a maximum cross sectional area near the end thereof. The blocking structure styles of FIGS. 3 and 4 also appear in the embodiments of FIGS. 10 and 8, respectively.

Figure 5:
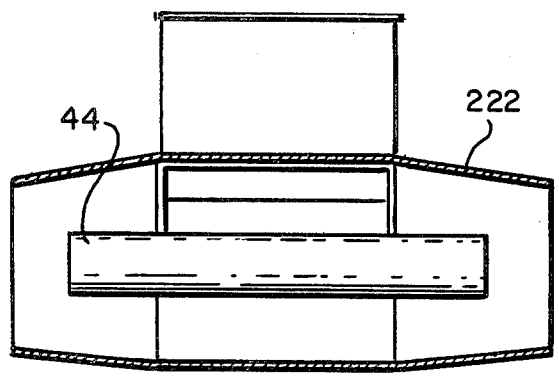
Figure 6:
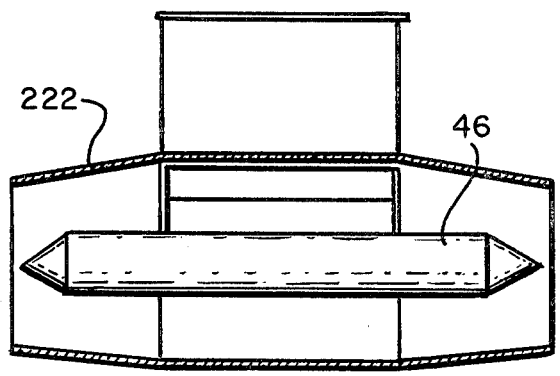
Figure 7:
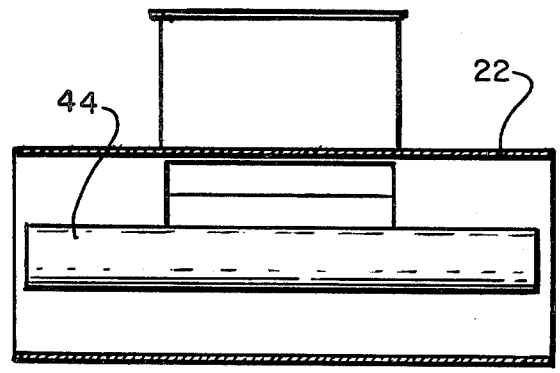
Figure 8:
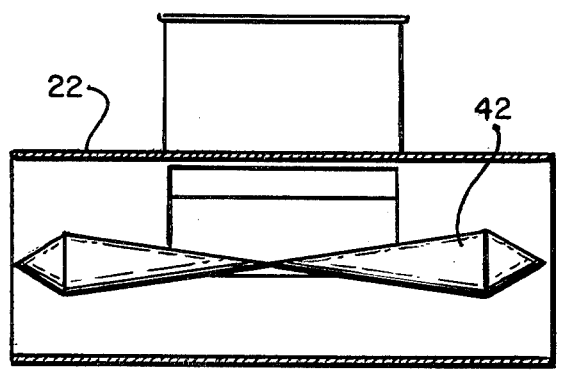

FIGS. 5 and 7 show embodiments wherein the blocking structure 44 is in the form of a cylinder having a constant cross sectional area. The embodiment of FIG. 6 shows a similar elongated structure 46 except that the ends thereof taper rapidly downwardly.

Figure 9:
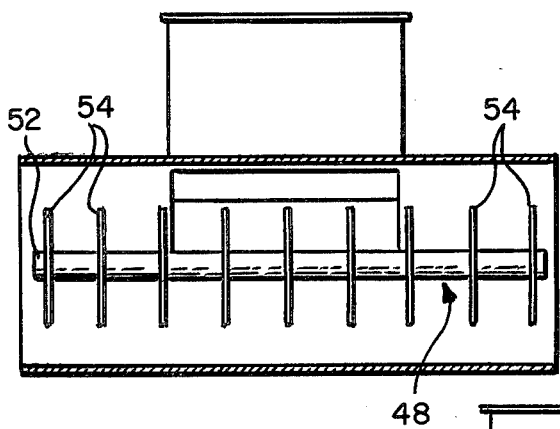
Figure 10:
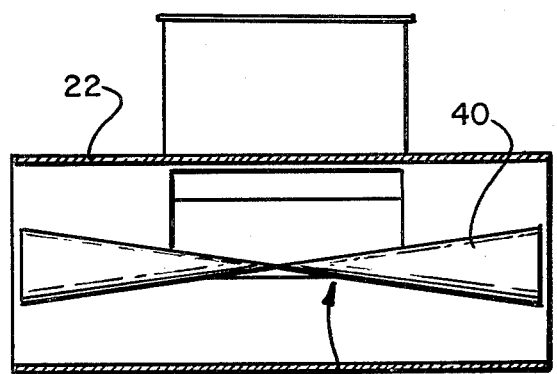
Figure 11:
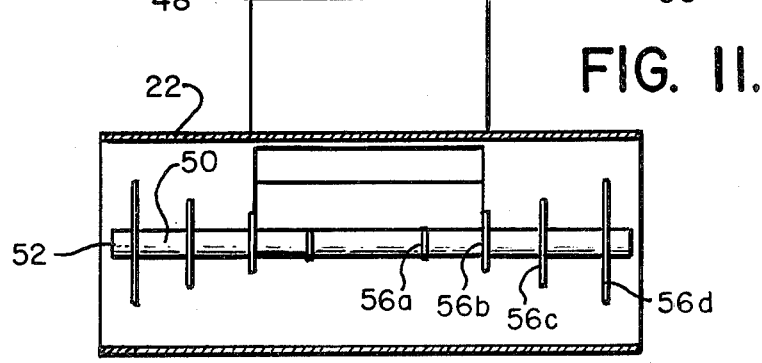

FIGS. 9 and 11 show still further blocking structures 48, 50 which are essentially a series of spaced apart disks mounted on a central constant diameter cylindrical support 52. In FIG. 9, the disks 54 are of constant size while, in FIG. 11, the disks 55a-55d are of increasing cross sectional area as measured from the innermost disk 55a to the outermost disk 55d.

Figure 12:
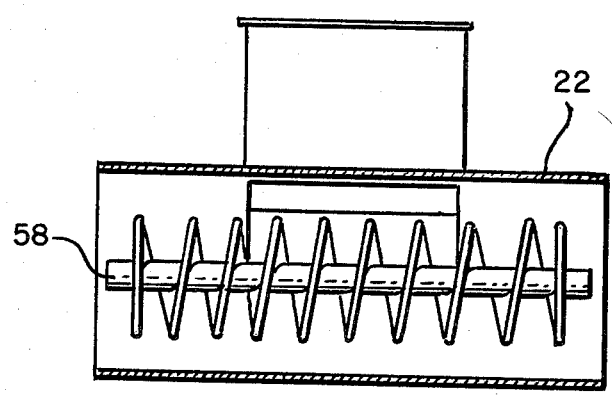
Figure 13:
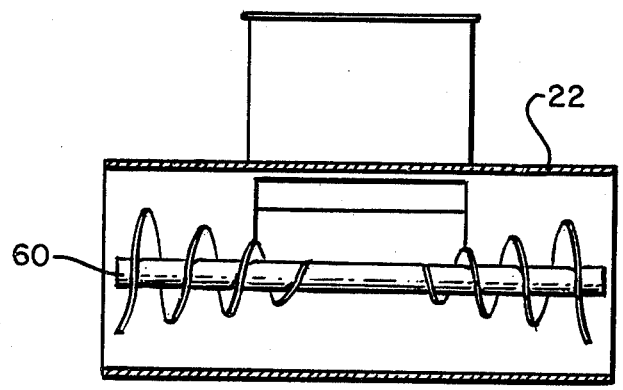

FIGS. 12 and 13 correspond generally to FIGS. 9 and 11 except that the elongated blocking structure is generally in the form of a helix or screw which, in FIG. 12, has a constant diameter 58 and, in FIG. 13, has a gradually increasing diameter screw 60 in FIG. 13.

The various embodiments shown in FIGS. 1-13 are shown with various mixing chamber 22, 122, 222, sectional shapes or forms. The simple tube-like structure 22 shown in FIGS. 1, and 7-13, is not unlike the prior art mixing chamber. With straight-tube mixing chamber 22, in order to form a venturi at the outlet ends thereof, the blocking structure is formed with an increased diameter outer end. Thus, for example, reference is made to FIGS. 1, 10, 11 and 13 wherein a venturi effect is accomplished at the outlet ends of the mixing chamber 22 by the blocking structure. The embodiment of FIG. 7 is without such a venturi effect which, as was discussed above, is not necessary for an improvement in operation over the prior art device. Similarly, FIGS. 9 and 12 are substantially without venturi effect at the chamber outlet.

The mixing chambers 122 of FIG. 2, and 222 of FIGS. 3–6, have end portions which either taper downwardly as shown in mixing chamber 222, or taper downwardly and then flare outwardly as shown in mixing chamber 122. This results in a constricted outlet which forms a venturi. Of course, this can be combined with an enlarged outer portion for the elongated blocking structure such as shown at 38b in FIG. 2.

Finally, the third system for improving mixing/washing in the inventive device is the venturi or necked funnel inlet structure 26. As can be seen in FIGS. 1 and 14, funnel inlet 26 has a necked portion 62 in a mid portion thereof which forms the inlet venturi.

The air deflector structures 34, 36 formed over the outlets 30, 32 of the mixing chamber 22 reduce the turbulence of the exhaust air as it exits the mixing chamber 22. As described above, this facilitates separating the liquid from the exhaust air. Air deflectors 34, 36 have a chord and circle arc cross section with the center of the arc located off-center with respect to the center axis of the blocking structure. Referring to FIG. 14 wherein the arrows represent the direction of flow of exhaust air through the washing device 20, the chord edge 64 of the air deflector 36 nearest the mixing chamber 22 is on a horizontal plane 66 which passes through the central axis 68 of the mixing chamber. The air deflector extends from there around in the direction of the air flow arrows a distance of 180° to 270° to the other edge 70 which is farther from the mixing chamber 22 than the edge 64. Preferably, the air deflector 36 extends from about 180° to about 225°.

In order to constrain the exhaust air to the influence of the air deflectors 34, 36, front walls 72, 74 and rear walls 76, 78 are formed on air deflectors 34, 36.

As in prior art devices, it has also been found expedient to include an elongated flange structure 80 along the length of the mixing chamber 22 to help break up smooth water flow within the mixing chamber 22.

As will readily be realized, various chamber shapes can be used with various of the elongated blocking structure shapes, as desired.

FIG. 14 shows a generally usual paint mist exhaust system wherein is disposed the washing device 20 of the present invention. As can be seen, air enters through funnel inlet 26 and sidewall inlet 24 and swirls around the chamber 22. After exiting the chamber, liquid and paint sludge formerly entrained in the air, as described in OS No. 2,800,668 referenced above, drops to the bottom of the exhaust system and the exhaust air passes through baffles 82, 84, 86 for final separation of the liquid from the exhaust air. The exhaust air then passes out through exhaust fans 88 for recycling or exhaust. A paint booth 90 is shown schematically above the exhaust system.

Figure 15:
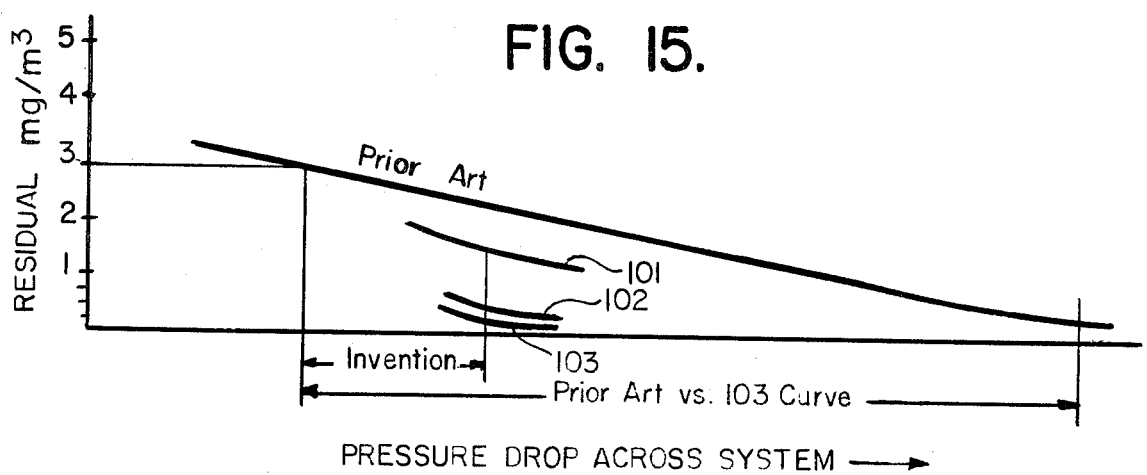
FIG. 15 shows typical prior art washing efficiency curves compared with similar curves projected for the present invention.

The data represented in FIG. 15 shows a comparison of washing efficiency for existing systems according to German O.S. No. 2,800,668 with those projected for the present invention. It is noted that some of the curves for the existing systems had to be projected to extreme operating conditions that are not normally obtained. That is, the washing efficiency range in which the present invention operates is far beyond that of the existing systems. In fact, with only small increases in energy consumption, cleaning efficiencies have been obtained in the range of 5 or 10 times less than the 3 mg. per cubic meter residual paint now considered "good" or even unattainable by other available systems on the market.

Although the operating parameters shown in FIG. 15 are generalized, they are based on actual data obtained from runs with inventive devices which are substantially of the same size as typically found in the prior art devices. Thus, for example, a (full-length) mixing chamber may normally have a diameter of 500–1000 mm and length in the range of 1000–2000 mm. Typically, for a 620 mm. diameter tube with a length of about 1500 mm, the radius of the air deflector would typically be about 600 mm and this would be off center by about 200 mm. Other chamber sizes would approximately maintain the same ratio for the other dimensions as illustrated for the 620 mm diameter chamber.

With respect to the elongated blocking structure, it is expected that an improvement would be available with almost any size although the embodiments illustrated in the drawings are typical of presently preferred embodiments and are shown substantially to scale. Actual dimensions depend on the chamber size selected. Optimum venturi outlet design, irrespective of the combination of elongated blocking structure and chamber configuration, is sized to give a velocity of exhaust air flow through the venturi of about 2 to 6 times the velocity of air flow in the washing chamber.

In order to show the magnitude of the improvement of the present invention over the prior art, FIG. 15 is presented with the prior art (German O.S. No. 2,800,668) parameters extended well beyond their normal range. Thus, as was discussed above, prior art systems rarely attain washing efficiencies of better than 3 mg. per cubic meter residual paint. It was therefore necessary to project well beyond the normal range the "remaining particle" curve for the existing systems. Practical systems simply are not operated at such extremes because of the cost and practical problems involved in designing such a system. The three "remaining particle" curves for the invention, indicated as 101, 102 and 103, represent, respectively, projecting parameters for a washing device having only an elongated blocking structure (curve 101); a washing device having an elongated blocking structure and venturi outlet (curve 102); and a washing device having all three systems—blocking structure, venturi inlet and venturi outlet, e.g. the device of FIG. 1 (curve 103).

As can be seen from FIG. 15, obtaining the extremely low remaining particle concentration which is possible with the inventive system requires several times the increase in pressure differential over that required by the present invention. The savings in pressure differential is the difference between that required by the present invention and that required by the prior art. Remembering that energy use is exponentially proportional to the pressure differential required, one can readily realize the tremendous energy saving of the present invention over the energy projected to be required by the prior art system, assuming the prior art system could be operated at such high washing efficiencies.

EXPERIMENTAL

Using the configuration of FIG. 3 (½ structure used for lower capacity and therefor less paint required for the tests)

Steel tube mixing chamber (½ chamber)

length—820 mm
diameter—620 mm
tapered end diameter 520 mm
taper is at about 7°

Blocking structure steel cone (hollow)—base diameter 200 mm, length—570 mm

Inlet funnel 500 mm×320 mm rectangular cross-section with the smallest width (necked venturi portion) being 200 mm.

Air through the system during test was at a rate of 9200 cu meters per hour. The pressure differential maintained across the system was 1,400 pascal.

Paint was sprayed into the air at about 6–7 kg/hr to generate an inlet paint concentration of about 0.7 grams per cu meter.

Results

1. With a device as shown in FIG. 3 with all three systems: inlet venturi, outlet venturi and blocking structure, exhaust air paint particle concentration was reduced to about ¼ mg/m³.

2. Using only the blocking structure and outlet venturi of FIG. 3, exhaust air paint particle concentration was reduced to about ½ mg/m³.

In order to test the inventive device with blocking structure only, the tapered mixing chamber was replaced with an approximately equivalent straight cylinder with a length of 820 mm and diameter 620 mm. The blocking structure was a straight cylinder of 230 mm diameter. This eliminates the outlet venturi. Flow rate of exhaust air through the system was maintained at about 9200 cu meters per hour and paint sprayed into this air at 6–7 kg/hr to generate 0.79 grams per cu meter paint concentration.

Under these conditions paint particle concentration in the system exhaust was reduced to about 2 mg/m³. It is noted that pressure drop across this system was only 1050 pascals. If this were raised to 1,400 pascals used for the other tests, it is expected that the residual paint would be further reduced.

It will be appreciated that the above is illustrative of the invention, but not limitative as various modifications within the scope of the invention, will be obvious to the artisan.

What is claimed is:

1. In an apparatus of the type for removing paint mist from exhaust air also entraining a washing liquid, the apparatus having a cylindrical-sided mixing chamber having at least one open end, a funnel inlet through the cylindrical side of the mixing chamber for the paint mist, exhaust air, and washing liqiud, and means providing a pressure differential between the at least one open end of the mixing chamber and the funnel inlet for drawing the paint mist, exhaust air, and washing liquid through the funnel inlet into the mixing chamber, outwardly therethrough toward the at least one open end of the mixing chamber with spiraling, turbulent, liquid-and-air-mixing flow, and from the at least one open end of the mixing chamber, whereat the thus-mixed paint mist and washing liquid settle from the exhaust air for removal, the improvement comprising:

a blocking structure centrally disposed in the cylindrical-sided mixing chamber from a portion proximate a projection from the position of the funnel inlet through the cylindrical side thereof to an end portion proximate the at least one open end of the mixing chamber for blocking access of the flow in the mixing chamber to the central space occupied by the blocking structure, whereby to increase substantially the mixing efficiency in the mixing chamber and thus the removal of paint mist thereafter, and wherein the end portion of the blocking structure and the at least one open end of the mixing chamber being constructed and arranged to define a venturi-shaped outlet structure, whereby to provide enhanced turbulent flow at the outlet with reduced pressure drop across the outlet.

2. The apparatus of claim 1 wherein the funnel inlet comprises means constructed and arranged to form a venturi at the inlet through the cylindrical side of the mixing chamber for providing enhanced turbulent flow at the inlet with reduced pressure drop across the inlet.

3. The apparatus of claim 2 or 1 wherein the blocking structure is a cylinder.

4. The apparatus of claim 3 wherein the portion of the cylindrical blocking structure proximate a projection from the position of the funnel inlet has a smaller cross-sectional area than the end portion of the cylindrical blocking structure.

5. The apparatus of claim 3 wherein the end portion of the cylindrical blocking structure tapers in cross-section in the direction therealong away from the funnel inlet.

6. The apparatus of claim 2 or 1, wherein the blocking member structure comprises a series of spaced apart disks mounted on and extending radially outwardly from a cylinder extending centrally along the mixing chamber.

7. The apparatus of claim 6 wherein the disks are progressively smaller in surface area along the cylinder toward the funnel inlet.

8. The apparatus of claim 2 or 1, wherein the cross-section of the mixing chamber at least near the at least one open end thereof is smaller than the cross-section thereof near the funnel inlet.

9. The apparatus of claim 8 wherein the mixing chamber flares out at the at least one open end thereof.

10. The apparatus of claim 2 or 1, and further comprising means for facilitating the separation of the washing liquid from the exhaust air by reducing their turbulence as they exit the at least one open end of the mixing chamber comprising an air deflector disposed at the at least one open end of the mixing chamber and being defined by an arc of a circle the center of which is on a horizontal plane passing through the central axis of the cylindrical-sided mixing chamber, but not coincident with the central axis, the air deflector extending from an edge on the horizontal plane to a second edge 180°–270° therefrom, the second edge being disposed farther from the central axis of the mixing chamber than the first edge.

11. In an apparatus of the type for removing paint mist from exhaust air also entrained a washing liquid, the apparatus having a cylindrical-sided mixing chamber having at least one open end, a funnel inlet through the cylindrical side of the mixing chamber for the paint mist, exhaust air, and washing liquid, and means providing a pressure differential between the at least one open end of the mixing chamber and the funnel inlet for drawing the paint mist, exhaust air, and washing liquid through the funnel inlet into the mixing chamber, outwardly therethrough toward the at least one open end of the mixing chamber with spiraling, turbulent, liquid-and-air-mixing flow, and from the at least one open end of the mixing chamber, whereat the thus-mixed paint mist and washing liquid settle from the exhaust air for removal, the improvement comprising:

a blocking structure centrally disposed in the cylindrical-sided mixing chamber from a portion proximate a projection from the position of the funnel inlet through the cylindrical side thereof to an end portion proximate the at least one open end of the mixing chamber for blocking access of the flow in the mixing chamber to the central space occupied by the blocking structure, whereby to increase substantially the mixing efficiency in the mixing chamber and thus the removal of paint mist thereafter, and wherein the funnel inlet comprises means constructed and arranged to form a venturi at the inlet through the cylindrical side of the mixing chamber for providing enhanced turbulent flow at the inlet with reduced pressure drop across the inlet.

* * * * *

UNITED STATES PATENT AND TRADEMARK OFFICE
CERTIFICATE OF CORRECTION

PATENT NO. : 4,483,698
DATED : November 20, 1984
INVENTOR(S) : G. Kuchenthal

It is certified that error appears in the above-identified patent and that said Letters Patent is hereby corrected as shown below:

Claims 3, 6, 8 and 10, line 1, change "or" to a comma -- , -- and after "1," insert -- or 11, --.

Signed and Sealed this

Tenth Day of September 1985

[SEAL]

Attest:

DONALD J. QUIGG

Attesting Officer  Acting Commissioner of Patents and Trademarks - Designate